United States Patent [19]

Nagashima et al.

[11] Patent Number: 4,505,611
[45] Date of Patent: Mar. 19, 1985

[54] UPHOLSTERY FIXING DEVICE

[75] Inventors: Tsuneyasu Nagashima, Kanagawa; Youji Sato, Yokohama, both of Japan

[73] Assignees: Kasai Kogyo Co., Ltd., Tokyo; Nifco Inc., Yokohama, both of Japan

[21] Appl. No.: 469,496

[22] Filed: Feb. 24, 1983

[30] Foreign Application Priority Data

Feb. 26, 1982 [JP] Japan .................... 57-25795[U]

[51] Int. Cl.³ .................. B25G 3/00; A44B 21/00; B60R 13/02; E04B 1/38
[52] U.S. Cl. .................. 403/406; 403/11; 403/405; 411/508; 411/509; 24/290; 24/297; 52/489; 52/511
[58] Field of Search .......... 403/406, 11, 21, 405, 403/408; 411/508, 509, 510, 57; 24/297, 290, 457, 453, 366; 52/511, 512, 489, 713

[56] References Cited

U.S. PATENT DOCUMENTS

| 3,037,596 | 6/1962 | Fordyce | 24/297 |
| 3,119,476 | 1/1964 | Pearson | 52/511 |
| 3,249,973 | 5/1966 | Seckerson | 24/297 |
| 3,771,275 | 11/1973 | Seckerson | 403/406 |
| 3,889,320 | 6/1975 | Koscik | 24/297 |
| 3,894,377 | 7/1975 | Welch | 52/713 |
| 4,312,165 | 1/1982 | Mizusawa | 411/510 |

Primary Examiner—Cornelius J. Husar
Assistant Examiner—Todd G. Williams
Attorney, Agent, or Firm—Trexler, Bushnell & Wolters, Ltd.

[57] ABSTRACT

An upholstery fixing device consists of a bracket having a holdfast suspended therefrom with bendable or flexible straps. In use the bracket is riveted to the back of a trim board, and the holdfast is pushed into an associated aperture of an inside panel of a car door. Then, the bendable straps can be yieldingly bent to automatically reduce any misalignment between a fixed bracket (and hence its holdfast) and an associated aperture of the inside panel of the car door, thus facilitating the fixing of the upholstery to the inside panel of the car door in exact registration.

11 Claims, 10 Drawing Figures

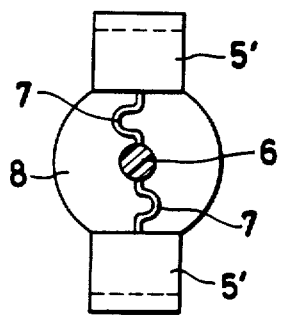
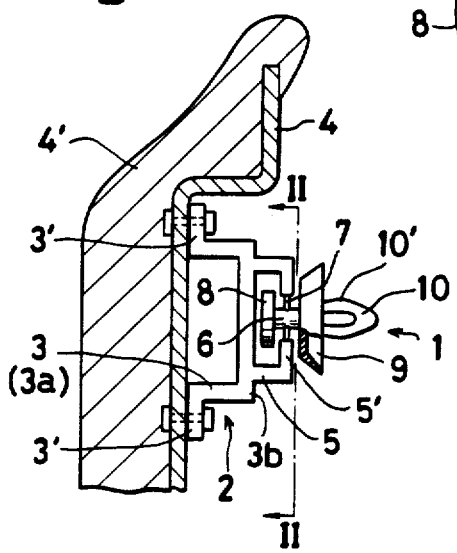
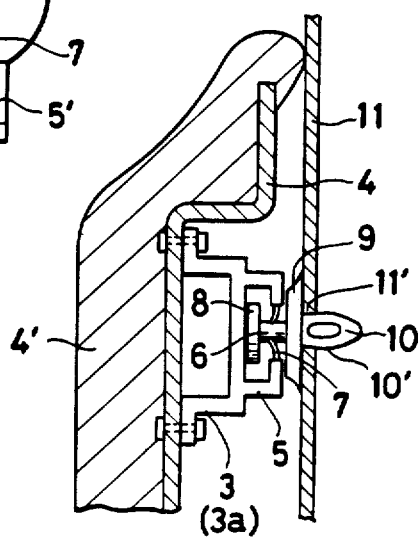
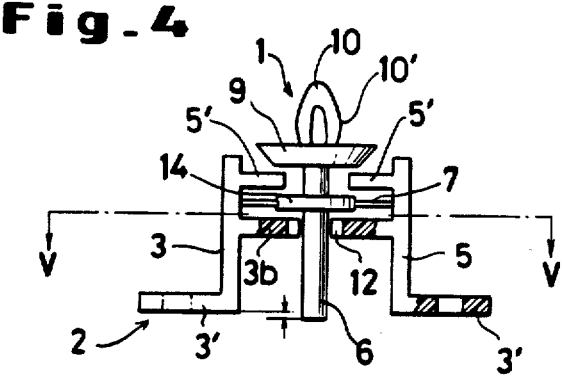
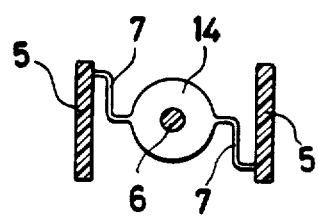
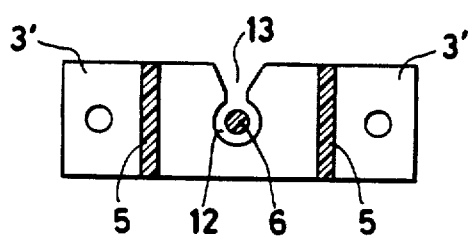
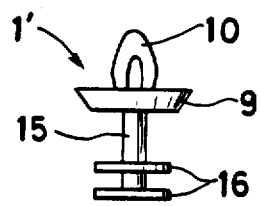

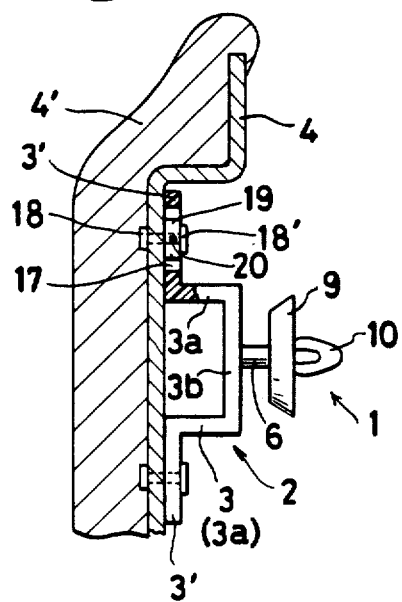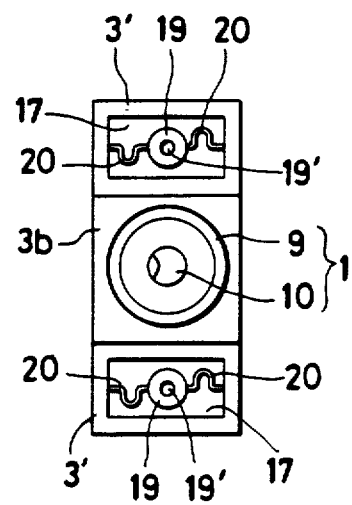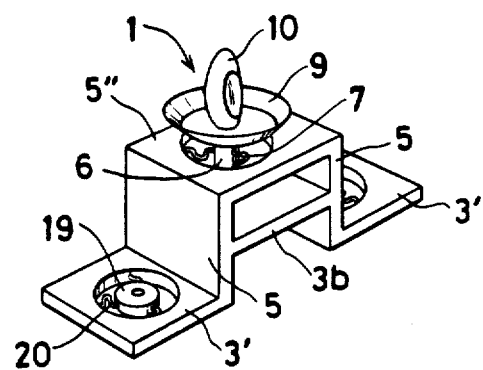

UPHOLSTERY FIXING DEVICE

BACKGROUND OF THE INVENTION

This invention relates to a panel-to-panel fixing device, and more particularly to an upholstery fixing device for use in fixing an upholstery member to the inside panel of a car door.

A covering or upholstery is applied to a trim board by applying a negative pressure to the upholstery or sucking the same, and the trim board thus covered with the upholstery is fixed to the inside panel of the car door with appropriate connectors. Specifically, the connectors connect the trim board and the inside panel closely with their heads and tails pushed into the apertures of the trim board and those of the inside panel, respectively. When pushing the tail of a connector in an associated aperture in the inside panel of the car door, the connector is likely to skew, and then the connector must be set upright. This tendency lowers the work efficiency. Still disadvantageously when the covering is sucked and applied to the trim board, the covering sinks partly at different places corresponding to the apertures made in the trim board for accommodating connectors, thus causing unsightly depressions to appear over the whole surface of upholstery. In an attempt to eliminate such unpleasing appearance, a plurality of depressions rather than apertures or a continuous groove is made on the back of the trim board and a plurality of brackets are fixed to those depressions or the continuous groove with rivets. Then, the heads of connectors are fixed in the brackets, and the tails thereof are pushed in the apertures of the inside panel of the car door. In this case two different kinds of parts, that is, connectors and brackets are required, and accordingly extra assembling work is required. The fixing apertures of a trim board are likely to be in inaccurate alignment with the counter apertures of the inside panel of the car door. For the purpose of effecting positional adjustment as required for compensating for such misalignment the fixing apertures made in the trim board and the inside panel of the car door are made, for instance, in the form of cocoons. Therefore, the boring work is relatively laborious.

SUMMARY OF THE INVENTION

The object of this invention is to provide an upholstery fixing device consisting of a one-body connector-and-bracket, permitting automatic adjustment of a trim board relative to an inside panel, thereby assuring their exact registration despite any misalignment between the brackets fixed to the back of the trim board and associated apertures of the inside panel. To attain this object the upholstery fixing device according to this invention consists of a bracket having an opening at its center, and a holdfast in the center opening of the bracket and suspended therefrom with bendable or flexible straps. In use the bracket is riveted to the back of a trim board, and the holdfast is pushed into an associated aperture of an inside panel. The flexible straps are adapted to yieldingly bend to reduce any misalignment between the center of the bracket and hence the holdfast and an associated aperture of the inside panel, thus facilitating the fixing of the trim board to the inside panel of the car door in exact registration. Other objects and advantages of this invention will be understood from the following description of preferred embodiments, which are shown in the accompanying drawings.

BRIEF DESCRIPTION OF THE DRAWING

FIG. 1 shows a side elevation of a first embodiment according to this invention in the state of being fixed to a trim board.

FIG. 2 shows a cross section taken along the line II—II in FIG. 1 at an enlarged scale.

FIG. 3 shows how an upholstery member is applied to an inside panel of a car door with the upholstery fixing device of FIG. 1.

FIG. 4 shows a side view of a second embodiment according to this invention.

FIG. 5 is a cross-section of the upholstery fixing device taken along the line V—V in FIG. 4.

FIG. 6 is another cross-section of the upholstery fixing device taken somewhat above the line V—V in FIG. 4.

FIG. 7 shows a side elevation of an extra holding element.

FIG. 8 is a side view of a third embodiment according to this invention.

FIG. 9 is a plan view of the upholstery fixing device of FIG. 8.

FIG. 10 is a perspective view of an upholstery fixing device according to a fourth embodiment.

DESCRIPTION OF THE PREFERRED EMBODIMENTS

This invention relates to a device for holding a trim board etc. to an inside panel of a car door.

Referring to the drawings, a holdfast 1 and a bracket 2 are molded of plastic as a single whole. The bracket 2 has an "Ω"-shaped base 3, and the bracket is fixed to the back of the trim board 4 by riveting its lateral extensions 3'.

Referring to FIGS. 1-3, there is shown a first embodiment according to this invention. Two opposite flanges 5 rise from the upper plate 3b of the "Ω"-shaped base and two lateral projections 5' extend inward from the ends of the flanges. A headed axle 6 of the holdfast 1 is connected to the lateral projections 5' by a plurality of flexible straps 7. The head plate 8 is put between the upper plate 3b and the lateral extensions 5'. A sucking disk 9 is integrally connected to the tail end of the headed axle 6, and the sucking disk 9 extends just above the lateral projections 5'. The holdfast tip 10 extends from the center of the sucking disk. In place of the lateral projections 5' a plate having an aperture somewhat smaller than the axle's head 8 may be integrally connected to the lateral flanges 5, and then the axle may be connected to the circumference of the aperture of the plate by a plurality of flexible straps (See FIG. 10).

When the holdfast tip 10 is pushed into an aperture 11' of the inside panel 11, the holdfast tip 10 is yieldingly deformed to pass therethrough. Then, the sucking disk 9 is applied to the front surface of the inside panel 11, and the thick part 10' of the holdfast tip appears above the back surface of the inside panel. The root of the holdfast tends to return to its original shape by the force of restitution, thus being caught in the aperture 11' of the inside panel 11. No matter what shape the holdfast may be, it must function in this way, and must assure stable fastening to the inside panel 11.

A plurality of brackets with holdfasts are riveted to the back of the trim board 4 at places corresponding to the fixing apertures 11' of the inside plate 11 of a door, and an upholstery member 4' is applied to the front of the trim board 4. Then, the composite panel can be fixed to the inside plate 11 of the door simply by pushing the holdfasts 10 into the fixing apertures 11' of the inside panel 11. Even if the holdfasts should not be in exact alignment with the fixing apertures of the inside plate the flexible strips are yieldingly bent to reduce the misalignment.

When the holdfast is pushed into the fixing aperture in the inside panel, the collar 9 of the sucking disk is brought in contact with the upper surfaces of the opposite projections 5', thereby preventing the breaking of the flexible straps 7. When the trim board is pulled and removed from the inside panel of a car door for maintenance and repair of locks, window regulators and other parts within the door, the head 8 of the headed axle is brought in contact with the undersurface of the lateral projections 5', thereby preventing the breaking of the flexible straps.

FIGS. 4-7 shows a second embodiment according to this invention. This embodiment is essentially the same as the first embodiment, but it is designed to allow reuse of the bracket by putting an extra holdfast element therein when the bendable or flexible straps 7 are broken.

As shown in FIG. 5, the upper plate of an "Ω"-shaped base has a circular and divergent opening. The center aperture 12 is somewhat larger in diameter than the axle of the holdfast and the adjoining divergent passage 13 is open at one longitudinal edge and is barely wide enough to permit the axle of the holdfast to pass therethrough.

In this second embodiment the holdfast has a collar 14 between the upper plate 3b and the opposite projections 5' of the bracket, and the collar 14 is connected to the lateral flanges 5 by a plurality of flexible straps 7. The opposite projections 5' extend between the collar 14 and the sucking disk 9 of the holdfast 1. The axle 6 of the holdfast passes through the center aperture of the upper plate, and ends somewhat beyond the lower surface of the lateral extensions 3' of the bracket 2.

When the bracket 2 is fixed to the trim board with the undersurface of the lateral extensions 3' of the bracket pushed against the back of the trim board, the axle 6 of the holdfast is raised, causing the flexible straps 7 to yieldingly deform, and putting the collar 14 of the holdfast just below the opposite projections 5' of the bracket 2. After all the holding units required are fixed to the back of the trim board, an upholstery member is applied to the front surface of the trim board.

In this embodiment when the bracket 2 is fixed to the back of a trim board, the axle 6 of the holdfast 1 stands on the back of the trim board, and therefore, when pushing the holdfast tip 10 into an associated aperture 11' of the inside panel, the force of reaction is applied to the back of the trim board through the axle of the holdfast, thereby preventing the breaking of the flexible straps, which otherwise would be caused by subjecting the flexible straps directly to the reaction. When removing the holdfast 1 from the associated aperture, the collar 14 is caught by the opposite extensions 5', thereby preventing the breaking of the flexible straps. In molding an upholstery fixing device it is necessary to provide a space of one milimeter or more between the collar 14 and the opposite projections 5'. In this embodiment the axle 6 of the holdfast is pushed up and raised when the bracket is fixed to the back of the trim board, and then the space between the collar 14 and the opposite projections 5' is reduced accordingly. Therefore, when the upholstery fixing device is pulled and removed from the inside panel, the collar 14 is caught by the opposite projections 5' immediately, thus effectively preventing the breaking of the flexible straps 7. When the bracket is fixed to the trim board, the flexible straps 7 are somewhat deformed, but they are still deformable enough to compensate for any misalignment between the holdfast and an associated aperture of the inside panel of the car door.

If the flexible straps 7 should be broken in the removal of an upholstery fixing device from the inside panel of the car door, an extra holdfast 1' (FIG. 7) is used in place of the broken one. The extra holdfast 1' has two collars 16 integrally connected to the axle of the element. These collars 16 are larger in diameter than the center aperture 12 of the upper plate of the bracket, and are spaced apart from each other by a distance longer than the thickness of the upper plate. The length of the axle 15 between the two collars 16 is pushed into the center aperture of the upper plate through the adjoining divergent passage 13. The extra holdfast 1' is free to move within the center aperture 12 of the upper plate, thus compensating for any misalignment between the holdfast and the associated aperture of the inside panel of the car door.

In the embodiments described so far, the flexible straps 7 connecting the bracket and the holdfast function to compensate for any misalignment between the holdfast and an associated aperture of the inside panel of the car door. Alternatively, a bracket may be designed to move with respect to the rivets with which the bracket is fixed to the trim board, thereby enabling the bracket to compensate, in terms of its position, for any misalignment between the holdfast and the associated aperture in the inside panel of the car door.

Referring to FIGS. 8 and 9 there is shown a third embodiment which allows the bracket to compensate for any misalignment between the holdfast and the associated aperture in the inside panel for a car door. As shown in these drawings, each lateral extension 3' of the bracket has a square opening 17, and an apertured piece 19 is put in the square opening 17 and is connected to the lateral extension 3' with two bendable or flexible straps 20. The bracket 2 is fixed to the back of a trim board 4 by inserting a rivet 18 in the aperture 19' of the suspended piece 19, thrusting the rivet through a trim board 4, and enlarging or deforming the tip of the rivet onto the front surface of the trim board 4. Then, an upholstery member 4' is applied to the trim board 4.

When the trim board 4 is applied to the inside panel of a car door, the flexible connection between the bracket 2 and the holdfast 1 allows the bracket 2 to move and compensate for any misalignment between the holdfast and an associated aperture of the inside panel of the car door, thereby leaving the holdfast in the associated aperture of the inside panel.

In the third embodiment the suspension of the pieces 19 by the flexible straps 20 allows the bracket 2 to move relative to the rivets 18, and therefore the rivets 18 may be integrally provided to the upper plate 3b of the bracket.

Referring to FIG. 10, a cross plate 5" is integrally connected to the opposite lateral flanges 5 of a bracket. The cross plate 5" has an aperture larger in diameter than the axle 6 of a holdfast 1, and the axle 6 is connected to the circumference of the aperture with a plurality of flexible straps 7. Also, each lateral extension 3' of the bracket has a suspended piece 19, as in the third embodiment. Thanks to the double flexible connection both at the lateral extensions 3' and the cross ceiling plate 5" of the bracket, the upholstery fixing device can compensate for an increased misalignment between the holdfast and the associated aperture of the inside panel of a car door.

What is claimed is:

1. A device for fixing a first panel member to a second panel member comprising: a bracket to be fixed to the first panel member, said bracket including first connecting means connectable to said first panel member and an upper plate; a holdfast comprising a holdfast tip insertable into an associated aperture in a second panel member, and an axle extending rearwardly from said tip; second connecting means connecting said holdfast to said bracket; and at least one of said first and second connecting means comprising a plurality of flexible straps operatively disposed between said first panel member and said holdfast when the device is fixed to the first panel member for permitting adjustment of the holdfast relative to the first panel member and thus accommodating any misalignment with the aperture in the second panel member.

2. A fixing device according to claim 1 wherein the axle of said holdfast has a headpiece at its bottom end, said bracket and said holdfast being integrally combined with the head of the axle just above said upper plate of said bracket, and said flexible straps being located for joining said holdfast to said bracket.

3. A fixing device according to claim 1 wherein said bracket has opposite flanges integrally connected to opposite ends of said upper plate, and lateral extensions respectively integrally connected to ends of such flanges opposite to the ends of the flanges at which they are connected to said upper plate, said flexible straps extending between and joining said holdfast and said flanges.

4. A fixing device according to claim 3 wherein said flexible straps extend between said axle of the holdfast and said flanges.

5. A fixing device as defined in claim 3 wherein said holdfast includes a collar on said axle and said flexible straps extend between said collar and said flanges.

6. A fixing device according to claim 3 wherein said axle of said holdfast has a disc plate which is connected to the bracket by said flexible straps, said bracket further comprising a pair of opposite lateral projections extending from said flanges, said bracket and said holdfast being integrally combined with said lateral projections of said bracket extending between said disc plate and the tip of the holdfast.

7. A fixing device according to claim 1 wherein said upper plate of said bracket has a circle and divergent notch opening, the circle being larger in diameter than said axle of the holdfast, and the divergent notch joining the circle and opening at one longitudinal edge of said upper plate, thus allowing insertion of the axle of said holdfast in said upper plate.

8. A fixing device according to claim 1 wherein said bracket comprises opposite lateral extensions carrying said first connecting means.

9. A fixing device according to claim 8 wherein said first connecting means comprises aperture means through said lateral extensions for accommodating fasteners such as rivets and the like.

10. A fixing device according to claim 8 wherein each of said lateral extensions has an opening therethrough, and said first connecting means comprises a fixing piece located in said opening and connected to the circumference of the opening by said flexible straps, said bracket being fixed by securing said fixing pieces to said first panel member.

11. A fixing device as defined in claim 1 wherein said second connecting means comprises an integral junction between said axle and said upper plate.

* * * * *